Figure 1:
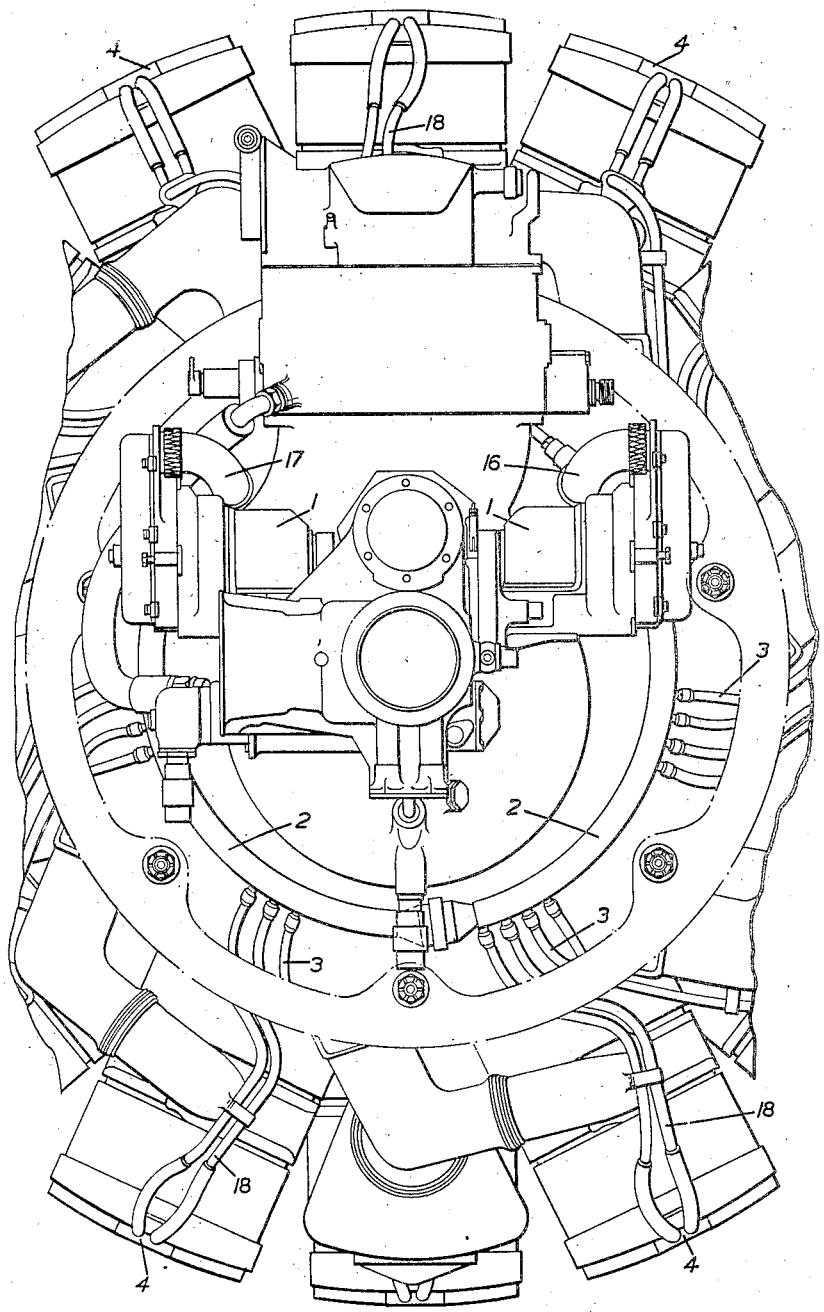

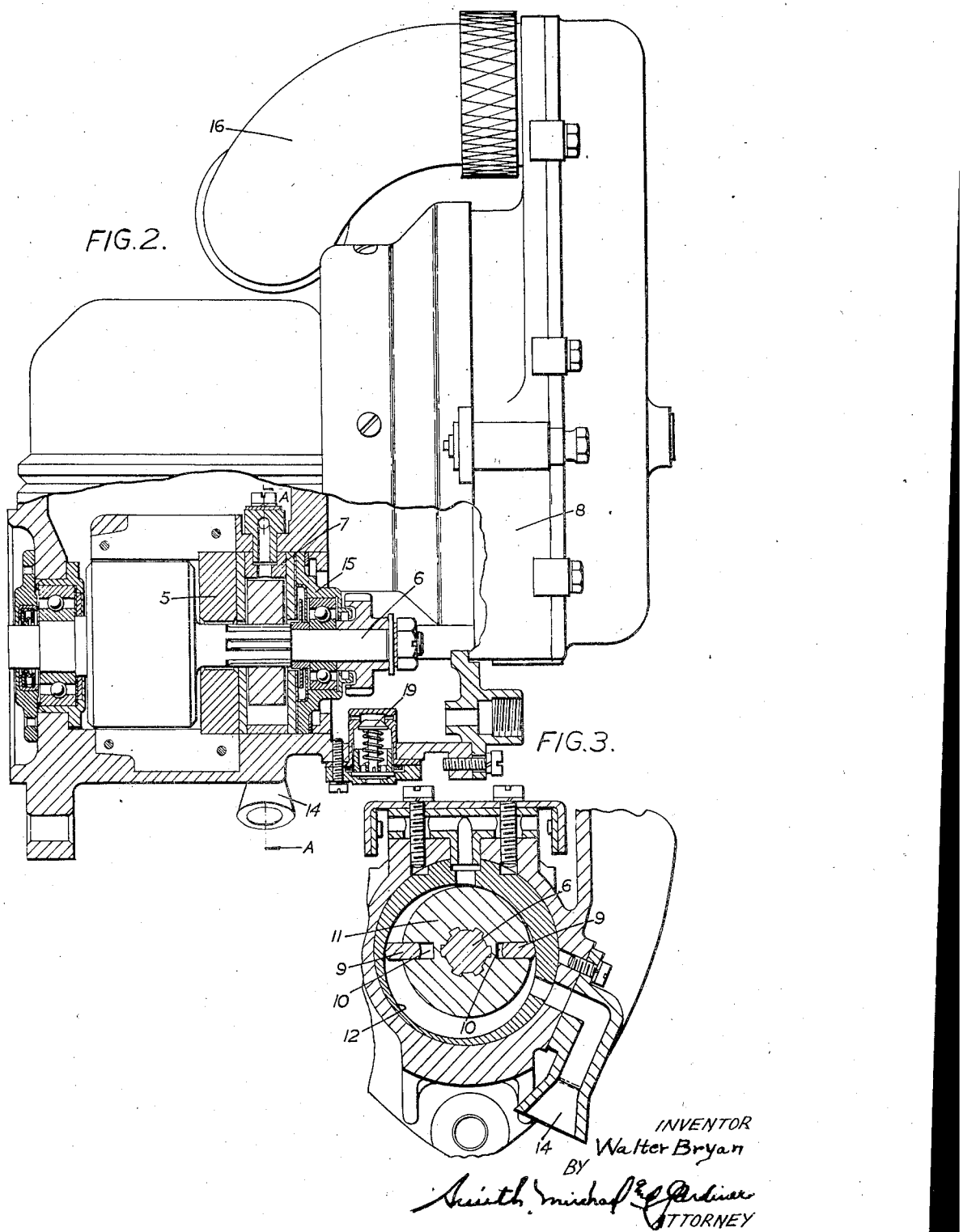

Patented Sept. 2, 1947

2,426,921

UNITED STATES PATENT OFFICE 2,426,921

ELECTRIC IGNITION APPARATUS

Walter Bryan, East Finchley, London, England, assignor to Simms Motor Units Limited, London N. 2, England, a British company Application July 7, 1943, Serial No. 493,794
In Great Britain July 24, 1942

4 Claims. (Cl. 172—209)

This invention relates to an electric ignition apparatus, and has particular reference to improvements in or relating to means for supercharging the high tension electrical ignition apparatus of an internal combustion engine, and more particularly of an internal combustion engine for use in high altitude flying.

The problem of obtaining efficient transmission of electrical energy from a magneto, or other sources of electrical impulses, to the sparking plugs of an internal combustion engine is much more difficult in the case of aircraft engines than it is on other types of internal combustion engines. Two of the most important considerations which make the problem more difficult are: firstly, that aircraft ignition systems must be completely shielded electrically by a metallic conduit if highly sensitive high-frequency radio receivers are to be employed; and secondly, that aircraft ignition systems must operate throughout a wide range of atmospheric pressures. Most of the ignition troubles of aircraft engines can be traced to either one or the other, or both of the above causes.

As a shielded distribution system or apparatus is generally employed in aircraft power plants of the internal combustion type, it is well recognized by those skilled in the art that there are numerous unfavorable conditions which arise which materially affect the efficient operation of the ignition and distribution systems of aircraft engines. These unfavorable conditions are frequently caused by the presence of undesirable and injurious fluids in the distribution system, which fluids may result from the entry of rain, sleet, anti-freeze fluids, deicing fluids, products of combustion, or the like into the shielding or other enclosing parts of the ignition and distribution system or apparatus, or from electrical or chemical phenomena which takes place within the shielding and which develops fluids, including acids, which break down insulation and have an injurious effect on the metallic surfaces of the shielding and other portions of the ignition and distribution systems or apparatus, and which may also increase the conductivity of any films of moisture present within the apparatus. These various fluids, regardless of their source, are a frequent cause of trouble and their presence frequently causes electrical spark-over with attendant spark plug and, hence, ignition, failure.

The difficulties above enumerated are recognized by those skilled in the art, and numerous means have been devised for overcoming such difficulties. Of these various means, the most effective is the provision of a supercharged ignition distribution system, by which is meant a system including apparatus by means of which air is supplied, free from harmful ingredients and at a pressure in excess of that of the surrounding atmosphere, to the space within the sparking plug shield chambers, with means enabling the contaminated air to be removed from these regions. The air is ordinarily conveyed through an ignition harness which already constitutes a conduit system to the sparking plugs because, through such a type of harness, clean air can be transmitted to and into all the sparking plug shield chambers and adjacent spaces without adding tubing or additional conduit of any sort. The very important consideration of providing means for the escape of contaminated air from within the system is accomplished by utilising the inherent leaks in the harness or, if necessary, small openings may be provided by drilling or adherence making holes in the shielding.

A careful study of the features and operation of known supercharged ignition distribution systems and apparatus, together with reference to the previously explained fundamental nature of the ignition distribution problems, some of which problems have been enumerated above, indicates that such systems or apparatus provide the necessary relief from all the various known forms of contamination encountered in service and thus insure reliable performance of the ignition and distribution system or apparatus.

While the known supercharged ignition distribution systems and apparatus include various and sundry means for increasing the air pressure within the magneto casing and harness, it is to be noted that in the prior art devices the pump is usually disposed exteriorly and remotely of the magneto casing, and the air is conducted from the pump to the magneto casing by suitable pipes or conduits. An example of such a system or apparatus is to be found in the patent to Scott 2,286,233 of June 16, 1942. In another known system or apparatus, a pump, either of the diaphragm or rotary type is located within a special and additional casing or compartment formed integral with, or attached to, the magneto casing. An example of such a system or apparatus is to be found in the patent to Wall 2,248,594 of July 8, 1941. In systems and apparatus of the type just referred to, it is to be particularly noted that additional equipment such as pumps, special casings or compartments, pipes, conduits and accessories therefor, are necessary, such equipment and accessories materially increasing the weight of the power plant and requiring valuable space for their installation. As is well known, weight and space are two vitally important considerations in modern aircraft design and an increase in weight or an allocation of space will not be permitted unless it can be definitely proved that such increase or allocation is absolutely essential to the efficiency of the aircraft power plant.

With the foregoing conditions in mind, it is an object of my present invention to provide a novel and efficient means whereby the high tension electrical ignition and distribution system or apparatus of an internal combustion engine may be maintained at all times in an atmosphere of at least a predetermined pressure without in any way increasing the space occupied by such system or apparatus. While this invention is primarily intended for use in connection with the ignition and distribution systems and apparatus of aircraft internal combustion engines, it is to be understood that it is capable of use on any internal combustion engine where its presence would be necessary or desirable.

According to the present invention, there is provided a magneto for use in the high tension electrical ignition system of an internal combustion engine, which system comprises a magneto of the polar inductor type having fixed magnets, wherein the fixed magnet hitherto provided in such a type of magneto is removed and replaced by a magnet of smaller dimensions but having an equivalent or greater maximum $B \times H$ value (for example a magnet formed from the materials made in accordance with the disclosures of applications for United States Letters Patent, Serial Nos. 408,389 and 408,390, filed August 26, 1941), and wherein a pump is mounted in the space afforded within the magneto casing by the employment of the smaller magnet, and is operable at the normal rotational speed of the spindle of the magneto to insure that a predetermined air pressure is maintained by the pump in the casing which encloses the magneto and in the ignition harness extending from said magneto casing to the spark plugs of the engine with which said magneto and harness are associated.

The invention will be more particularly described with reference to the accompanying drawings, in which:

Figure 1 illustrates in part elevation a rotary internal combustion engine having the subject matter of the present invention applied thereto;

Figure 2 illustrates in part elevation a polar inductor type of magneto having a fixed magnet of equal or greater $B \times H$ value to the fixed magnet hitherto employed in a magneto of the said type but of such dimensions as to provide a space sufficient to accommodate a rotary pump; and Figure 3 illustrates a section on the line A—A of Figure 2 of a rotary pump mounted upon the inductor spindle and operable to increase the air pressure within the magneto casing without increasing the dimensions thereof.

Referring to Figure 1 of the accompanying drawings, there is illustrated one method of carrying the invention into effect, in which a pair of magnetos 1 of the polar inductor type which constitute, together with their associated equipment, the high tension ignition system for a fourteen cylinder internal combustion engine.

The connections leading from the distributor of each magneto 1 extend, in known manner, through a harness 2 and thence by conduits 3 to the shield chambers 4 of the sparking plugs of the cylinders. Thus the electrical connections from the magneto to the sparking plugs are carried in a harness through which air under pressure can be circulated.

It is known that if air under a pressure in excess of the external atmospheric pressure is maintained in the harness around the electrical connections of the ignition system, the known defects inherent in such a system will be obviated.

Referring to Figure 2 of the accompanying drawings, there is illustrated in part elevation a magneto of the polar inductor type having fixed magnets.

In magnetos of the type referred to, the space hitherto occupied by thee fixed magnet was much greater than that illustrated because the maximum $B \times H$ value of the material hitherto employed for the magnet was such as to require a magnet of much larger dimensions.

According to the present invention the fixed magnet which was previously employed is replaced by a fixed magnet 5 formed from the material made in accordance with the aforesaid United States patent applications Serial Nos. 408,389 and 408,390. The material has such particularly good magnetic properties that it enables a magnet of equivalent $B \times H$ value to the magnet hitherto employed in the said type of magneto to be replaced by a magnet of substantially half the size, thus leaving space upon the inductor spindle 6 sufficient to accommodate a rotary pump 7 that at the normal speed of the spindle of the magneto will produce a pressure within the casing 8 of the magneto sufficient to prevent any flash-over in rarefied atmosphere and also to eliminate, where the magneto casing is connected to the ignition system by a harness, all the defects hereinbefore referred to which are inherent in such ignition systems.

The pump may be of any desired design but preferably comprises a rotary pump of the character illustrated in Figure 3 having two blades 9 arranged to reciprocate in radial slots 10 formed in a rotor 11 which is eccentrically disposed with relation to a casing 12. The blades are preferably formed of a graphite material, as also are the walls of the casing 12, thus obviating the necessity for the pump to be lubricated by material other than that of which the elements of the pump are composed.

The spindle 6 is preferably connected to the rotor of the pump by a plurality of splines, for example six, because it has been found that as the splines are increased so the wear between the rotor 11 and the spindle 6 decreases.

The pump is provided with an air inlet 14 directed downwardly so as to prevent, as far as possible, any moisture accumulating therein and being drawn into the pump. The inlet may if necessary be provided with means for cleansing and drying the air before it is drawn into the pump and forced into the magneto casing and through the harness of the ignition system. Further the magneto is provided with a control valve 19 operable to ensure that the pressure within the magneto casing and the harness does not exceed a predetermined maximum.

Preferably there is provided between the pump 7 and the bearings 15 an oil separator 16 operable to remove any oil which might tend to creep along the spindle 6 into the pump 7.

The casings of the magnetos 1 illustrated and described in Figure 2 in well known manner are connected to the harness 2 by conduits 16 and 17 arranged to house the electrical connections for the fourteen cylinders. The connections extend around the harness to the positions adjacent to their appropriate cylinders whereupon they extend through smaller tubes 18 into the sparking plug shield chambers 4.

By means of the pump 7 and the valve 19, the atmosphere in the casings of the magnetos 1, the conduits 16 and 17, the harness 2, the smaller tubes 18 and the sparking plug shield chambers 4 is maintained at a predetermined pressure sufficient to obviate the defects hereinbefore referred to, and increased pressure over that of the exterior atmosphere is produced, according to the present invention, without in any way increasing the size of the standard equipment of such an ignition system.

Thus it will be seen that according to the present invention there is provided a magneto for use upon aircraft operating at high altitudes, which has the distinct advantage that the size of the magneto is identically the same as that of a magneto in which a pump has not hitherto been employed.

Thus, aircraft at present employing a polar induction type of magneto having a fixed magnet which magneto, either alone or with its associated harness is not capable of being supercharged, can have its magneto converted into one operable at high altitudes by the mere removal of the existing fixed magnet and the substitution therefor of a magnet composed of the material above specified, or a material having similar or better maximum B×H values and thereafter mounting side by side with the magnet, a rotary pump which is operable from the spindle of the magneto, to maintain a required air pressure within the magneto casing or in the casing and the harness carrying the electrical connections of the system.

What I claim as my invention and desire to secure by Letters Patent of the United States is:

1. Electric ignition apparatus for internal combustion engines comprising a magneto of the polar inductor type, including an armature and, initially, a relatively large fixed magnet, the fixed magnet initially provided for said magneto being removable and replaceable; a drive shaft for rotating said armature; a casing completely enclosing said magneto; a fixed magnet of relatively smaller dimensions substituted for the fixed magnet initially provided for said magneto but having a maximum B×H value approximately equal to the B×H value of the fixed magnet which it replaces; and a rotary air pump within said casing and having its rotor mounted on the said drive shaft and driven thereby, said pump occupying the space within said casing provided by the substitution of the smaller fixed magnet for the relatively larger fixed magnet initially mounted in said casing, said pump discharging compressed air into said casing whereby the interior of said casing will be supercharged.

2. Electric ignition apparatus for internal combustion engines comprising a magneto of the polar inductor type including an armature and a fixed magnet; a drive shaft for rotating said armature; a casing completely enclosing said magneto; and a rotary air pump within said casing and having its rotor mounted on the said drive shaft intermediate the ends thereof, rotation of said drive shaft effecting operation of said pump, and said pump discharging compressed air into said casing whereby the interior of said casing will be supercharged.

3. Electric ignition apparatus for internal combustion engines comprising a magneto of the polar conductor type including an armature and a fixed magnet; a drive shaft for rotating said armature and including a splined portion intermediate the ends of said shaft; a casing completely enclosing said magneto; and a rotary air pump within said casing and having its rotor mounted on and driven by the splined portion of said shaft, rotation of said drive shaft effecting operation of said pump, and said pump discharging compressed air into said casing whereby the interior of said casing will be supercharged.

4. Electric ignition apparatus for internal combustion engines as defined in claim 2, wherein the rotary pump includes a rotor having radial blades extending therefrom and engaging the inner surface of the pump chamber, and wherein the surface of the blades and the inner surface of the pump chamber are made of graphite to thus obviate the necessity for the pump to be lubricated by material other than that of which said surfaces are composed.

WALTER BRYAN.

REFERENCES CITED

The following references are of record in the file of this patent:

UNITED STATES PATENTS

| Number | Name | Date |
|---|---|---|
| 1,926,968 | Causan | Sept. 12, 1933 |
| 2,248,594 | Wall | July 8, 1941 |
| 2,286,233 | Scott | June 16, 1942 |

FOREIGN PATENTS

| Number | Country | Date |
|---|---|---|
| 413,110 | Great Britain | July 12, 1934 |